United States Patent [19]
Hann

[11] Patent Number: 5,881,679
[45] Date of Patent: Mar. 16, 1999

[54] MAGNETIC PENDULUM DEVICE FOR FELINE AMUSEMENT AND EXERCISE

[76] Inventor: Lenn R. Hann, 1643 Kemper Dr., Naperville, Ill. 60563

[21] Appl. No.: 902,339

[22] Filed: Jul. 29, 1997

[51] Int. Cl.⁶ ................................................ A01K 29/00
[52] U.S. Cl. .......................................... 119/708; 119/707
[58] Field of Search .................................... 119/706, 707, 119/708, 709

[56] References Cited

U.S. PATENT DOCUMENTS

| | | | |
|---|---|---|---|
| 2,096,078 | 10/1937 | Windson . | |
| 3,295,499 | 1/1967 | Manchester | 119/708 |
| 4,011,674 | 3/1977 | Jacobson | 40/426 |
| 4,250,659 | 2/1981 | Ishiguro . | |
| 4,391,224 | 7/1983 | Adler . | |
| 4,517,922 | 5/1985 | Lind | 119/708 |
| 4,690,657 | 9/1987 | Lodrick, Sr. . | |
| 4,728,871 | 3/1988 | Andrews | 318/130 |
| 4,940,018 | 7/1990 | Edling | 119/708 |
| 5,060,947 | 10/1991 | Hall | 273/138 A |
| 5,119,001 | 6/1992 | Moore et al. | 119/708 X |
| 5,148,769 | 9/1992 | Zellinger | 119/708 |
| 5,269,261 | 12/1993 | McCance | 119/706 |
| 5,517,948 | 5/1996 | Udelle et al. | 119/706 |
| 5,595,141 | 1/1997 | Udelle et al. | 119/706 |
| 5,675,225 | 10/1997 | Moore et al. | 318/257 |

*Primary Examiner*—Robert P. Swiatek
*Assistant Examiner*—James S Bergin
*Attorney, Agent, or Firm*—Meroni & Meroni

[57] ABSTRACT

A magnetically actuated exercise and amusement device is disclosed for use with cats. The device includes a base structure and a support structure extending upwardly from the base structure. A pendulum assembly is connected to the support structure. The pendulum assembly includes an elongate vertical member and a pivot structure secured to a top portion of the elongate vertical member. A cat toy member is secured to a bottom portion of the elongate vertical member. A first magnet is provided in the base structure. A second magnet is disposed adjacent with a bottom of the cat toy member. A downwardly facing portion of the second magnet has a magnetically repelling polarity to a polarity of an upwardly facing portion of the first magnet.

31 Claims, 5 Drawing Sheets

MAGNETIC PENDULUM DEVICE FOR FELINE AMUSEMENT AND EXERCISE

BACKGROUND OF THE INVENTION

1. Field of the Invention

The present invention relates generally to devices designed for the amusement and exercise of cats, and more particularly, the invention pertains to a cat toy device having a magnetically actuated pendulum.

2. Description of the Prior Art

Cats are predatory creatures with precision tuned hunting skills. In the wild, cats chase their prey which may run in erratic patterns in an effort to make an escape. Unfortunately for the prey, cats are well adapted to following these wild movements, and eventually catch their intended targets. However, once the prey is caught, it is known that cats do not typically kill it right away, but rather toy with it for a while.

The cat's love for play is well known and often observed by cat owners. However, the domestic environment does not offer cats many chances to use their hunting skills. In the absence of such opportunities, the cat may become frustrated and perhaps even develop related illnesses. In order to avoid such problems, as well as provide a source of entertainment for the pet owner, many find it helpful to interact with their pets. There may be times when the owner does not have time or energy to play with their pets, and so may opt to purchase an animated toy as a substitute.

Many toys are currently available on the market for the amusement and exercise of cats. Some examples are U.S. Pat. Nos. 4,940,018, 5,119,001, 4,517,922, 4,391,224, 2,096,078, and 3,295,499. Many of these devices are composed of passive cat toys suspended from a string such as U.S. Pat. No. 3,295,499 issued to Manchester which is comprised of a ball suspended from a string designed for the cat to paw. A mechanical toy is illustrated in Moore et al., U.S. Pat. No. 5,119,001, which is composed of an electric, gear driven, frequency controlled oscillating device that oscillates a toy which is again suspended from a cord.

While these toys provide amusement and exercise, their repetitious motion can become very predictable to the cat, and potentially cause the cat to lose interest. Accordingly, it would be desirable to have a toy that has unpredictable motion which would be more challenging and stimulating for the cat. Such erratic movement would mimic those maneuvers that the cat's prey may use in the wild in order to facilitate its escape. These exercises would help keep the cat's instinctive hunting skills sharp and physically fit.

Furthermore, selectable attachments would enable the cat to play with many different kinds of toys. Such a feature would offer more of a variety to the cat similar to the different types of game that the cat would normally chase.

Moreover, it would be favorable to have a toy that could match the cat's dexterity as it ages and its responsiveness diminishes. Currently, many of the toys on the market are directed towards kittens and younger cats, and there is less available for the more mature cat. Such a device would provide great entertainment as well as exercise both of which are beneficial to the cat's health and well being.

As will be described in greater detail hereinafter, the cat toy device of the present invention solves all of the aforementioned problems and employs a number of novel features that render it highly advantageous over the prior art.

SUMMARY OF THE INVENTION

Accordingly, it is an object of this invention to provide a device that can move in an unpredictable manner so as to avoid repetitious movement.

Another object of this invention is to provide the cat with a multitude of toys to interact with consisting of different colors and forms.

Still another object of this invention is to provide a device that is adjustable to match the cat's dexterity as it ages and its responsiveness diminishes.

Yet another object of this invention is to provide amusement and exercise for the cat without direct owner interaction.

To achieve the foregoing and other objectives, and in accordance with the purposes of the present invention an exercise and amusement device is provided for cats. The device includes a base structure and a support structure extending upwardly from the base structure. A pendulum assembly is connected to the support structure. The pendulum assembly includes an elongate vertical member and a pivot structure secured to a top portion of the elongate vertical member. A cat toy member is secured to a bottom portion of the elongate vertical member. A first magnet is provided in the base structure. A second magnet is disposed adjacent with a bottom of the cat toy member. A downwardly facing portion of the second magnet has a magnetically repelling polarity to a polarity of an upwardly facing portion of the first magnet.

In accordance with an aspect of the invention, a height-adjustment assembly is provided for manually adjusting the vertical spaced apart distance between the bottom portion of the elongate vertical member and the base structure. A magnetic field strength between repelling first and second magnets is thereby adjustable by a user for varied cat toy member speed or movement.

In use, a cat is attracted to the cat toy and will accordingly bat the toy which is connected to the pendulum assembly, causing the cat toy to dart and bounce in an energetic, unpredictable fashion due to magnetic actuation as above described. When seized, the toy has been found to continue to twitch and jump in a most lifelike manner. This movement is very attractive and engaging to cats, and causes them to remain interested in playing for long periods of time. In addition, the cats tend to return to this device for repeated play more frequently than with other less engaging designs.

Accordingly, the base structure may be sized and adapted for containing additional pet toys or devices since the long lasting attractiveness of the magnetically actuated cat toy provides a lure to draw a cat's attention to other immediately adjacent toys.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
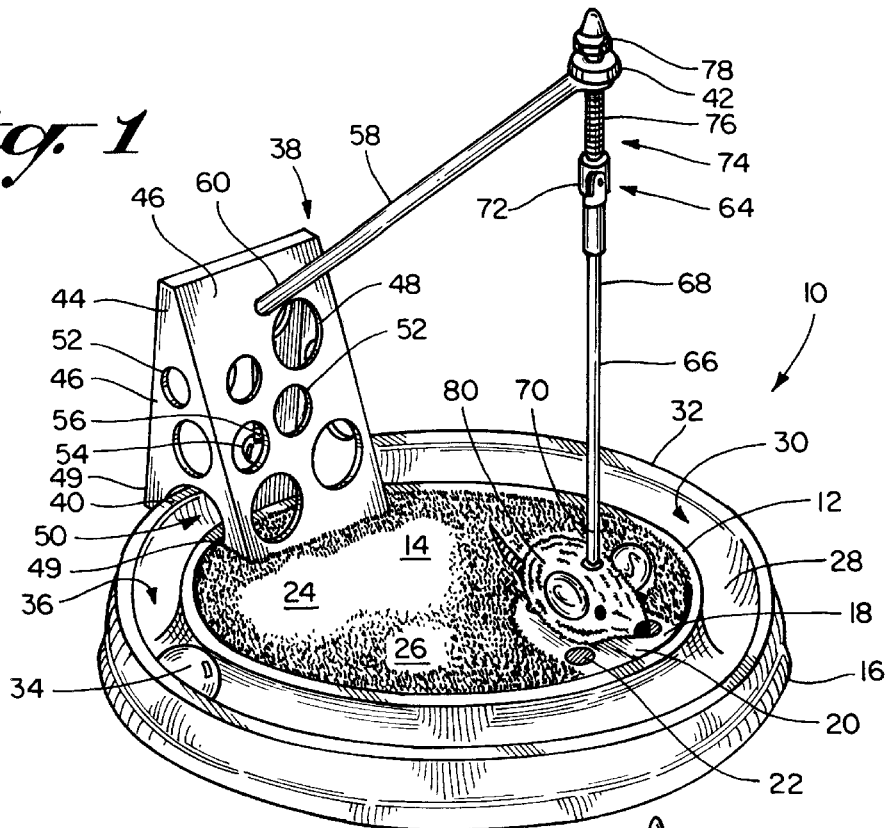
FIG. 1 is a perspective view of a magnetically actuated exercise and amusement device for cats in accordance with the purposes the present invention.

Referring now to the drawings, a magnetically actuated exercise and amusement device 10 for use with cats is illustrated in FIG. 1.

A horizontal base structure 12 has a generally flat center most portion 14 and a generally flat bottom portion 16 for placement on a surface where the base structure 12 is resistant to being tipped over. A magnet receiving platform or portion 18 of the base structure 12 includes a relatively flat and rigid surface 20. The magnet receiving platform houses permanent magnets 22 which are later described in more detail. Portions 24 of the base structure 12 adjacent to the platform 18 or magnets 22 include a durable covering 26 secured thereto. In a preferred embodiment, the durable covering 26 is penetrable by cat claws, such as carpet or rope.

The base structure 12 includes arcuately shaped sidewalls 28 defining a generally circular channel 30 extending about a perimeter 32 of the base structure 12. The circular channel 30 is configured for receiving a ball 34 in movable engagement within the channel 30. An opening 36 into the channel has a width less than a diameter of the ball 32 so that the ball 32 remains trapped within the channel 30 and is allowed to revolve about the channel 30 when moved by a cat's paw. It should be understood that other variations and shapes of base structures could also be used. However, where it has been found that the long lasting attractiveness of the magnetically actuated cat toy, as later described, provides a lure to draw a cat's attention to the base structure, the base structure is thereby well suited to be adapted for containing additional pet toys or devices.

A support structure 38 is connected with the base structure 12 and extends upwardly and outwardly from a side 40 of the base structure 12 such that a top portion 42 of the structure 38 is vertically above the magnet receiving platform 18. In a preferred embodiment shown in FIGS. 1 and 2, the support structure 38 includes a wedge-shaped housing 44 having a series of sidewalls 46 forming a hollow chamber 48 therewithin. The housing 44 is formed of plastic has lower edges 49 in snap fit engagement with the base structure 12. The housing 44 extends over the channel 30 to form a tunnel 50 to further enhance a cat's excitement.

Each sidewall has a series of randomly spaced holes 52 extending in communication with the hollow chamber 48. Each hole 52 has a diameter sized to permit a cat's paw to fit within to create an accessing opening into the hollow chamber 48. A cat toy member 54, such as a ball or bell, is disposed within the hollow chamber and is suspended by a spring 56 interconnecting the member 54 with the housing 44. Therefore, while the housing 44 is aesthetically pleasing in that it is shaped like a wedge of cheese, it should be noted that the construction as above described provides another unique and functional form of cat amusement that is connected with the base structure 12.

Figure 2:
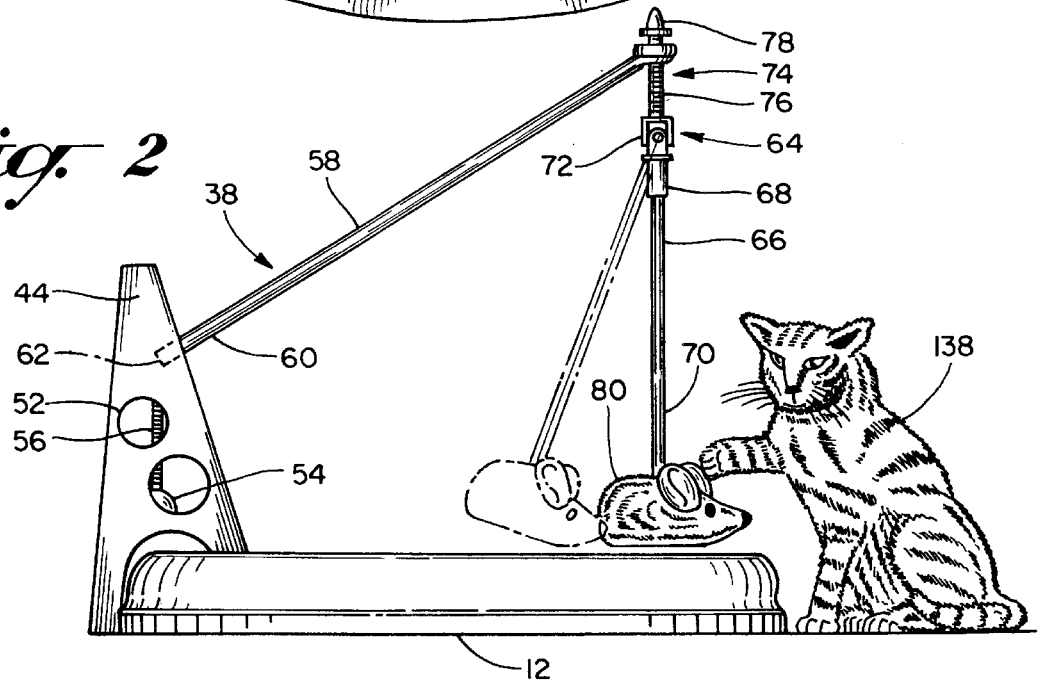
FIG. 2 is a side view of the present invention.

A cantilevered portion 58 of the support structure 38 is disengagably connected with the housing 44 for disengagement of the cantilevered portion 58 upon impact of a force thereupon, such a child falling upon. Referring to FIG. 2, a lower end 60 of the cantilevered portion 58 is pressed into a receiving sleeve 62. It may be appreciated that the easy disengagement of the cantilevered portion 58 with the housing 44 provides a safety feature to prevent both injury to a user and damage to the device 10 should a user or other animal fall upon the cantilevered portion 58. Further, the disengagement aids in reduced packaging size for the device 10 and provides for easy set-up of the device 10.

Figure 9:
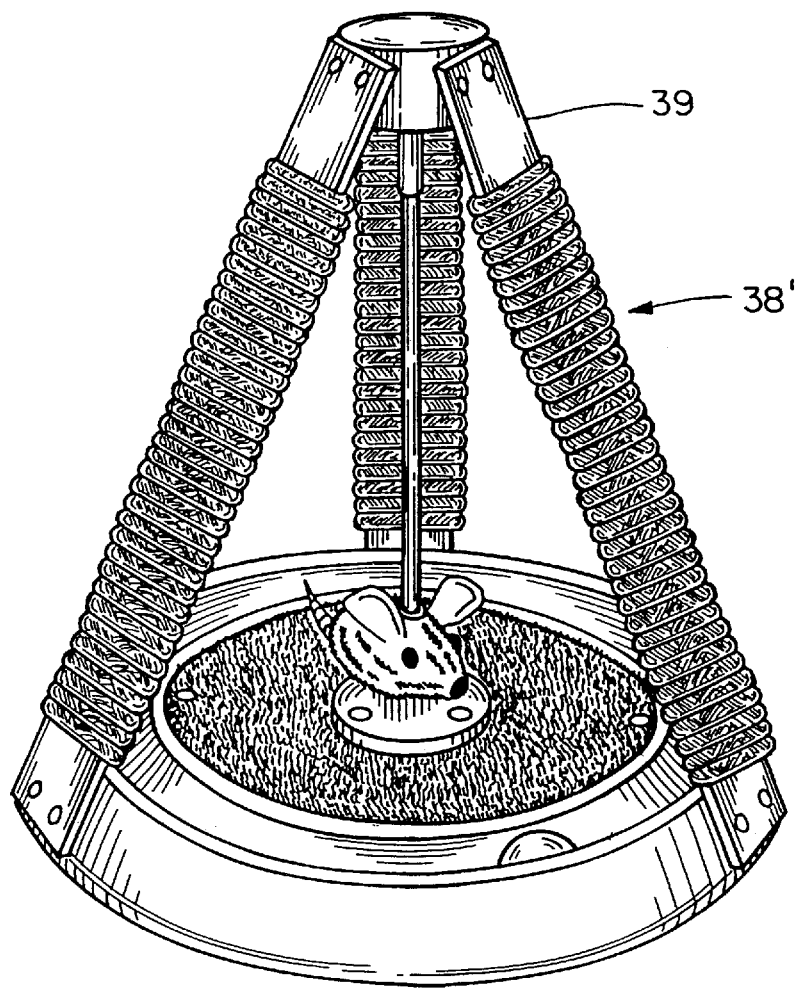
FIG. 9 is a perspective view of an alternative embodiment of the present invention.

Referring to FIG. 9, an alternative embodiment of a support structure 38' is illustrated where the use of a single cantilevered arm has been replaced by utilizing a tripod structure 39. It should be understood that other variations of the support structure 38' and base structure 12 could also be used.

Figure 3:
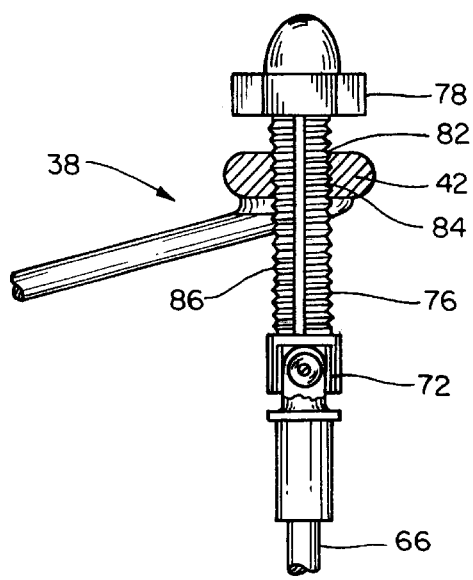
FIG. 3 is an enlarged view of an upper portion of the pendulum assembly illustrating one embodiment of the height-adjustment assembly.
Figure 4A:
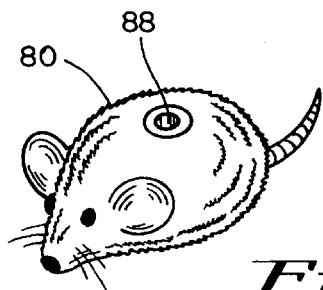
FIGS. 4a–4d are enlarged perspective views of several embodiments of cat toy members for use with the present invention.
Figure 4B:
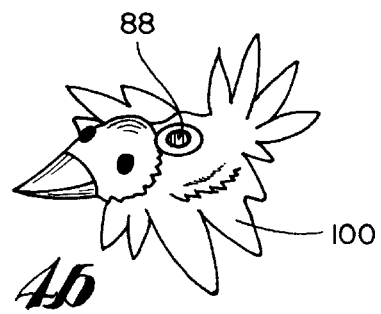
Figure 4C:
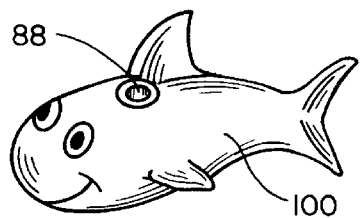
Figure 4D:
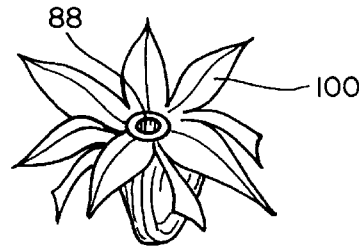

Referring to FIGS. 1–3, a pendulum assembly 64 is connected to the support structure 38. The pendulum assembly 64 includes a rigid elongate vertical member 66 having a top portion 68 and a bottom portion 70. A pivot structure 72 is secured to the top portion 68 of the elongate vertical member 66. In a preferred embodiment, the pivot structure 72 is a universal joint or U-joint which provides low-friction, close-tolerance 360° pivoting movement. A U-joint as herein disclosed is of the type used in the hobby industry for rotational wheel transmission in remote controlled motorized cars.

A height-adjustment assembly 74 is provided for manually adjusting the vertical spaced apart distance between the bottom portion 70 of the elongate vertical member 66 and the base structure 12 a distance of at least 0.25 inches. Preferably, the assembly 74 is adjustable in the range of 0.05 to 0.50 inches with the bottom of a later described second magnet 92 being at its lowest setting 0.05 inches from the base structure 12 or magnets 22. The height-adjustment assembly 74 includes a threaded adjustment shaft 76 and a rotatable adjustment knob 78 operatively connected with the adjustment shaft 76. The height-adjustment assembly 74 allows the magnetic field strength between repelling magnets, as later described, to be adjustable by a user for varied speed or movement of a cat toy member 80.

It is also significant to note that the height-adjustment assembly 74 serves yet a another function in that adjustment of the bottom portion 70 is often needed after set-up of the device 10 based on various tolerance differences between connecting components. For example, the cantilevered portion 58 when connected within the sleeve 62 may connect slightly different between similar devices 10, which in turn will effect the angle and height of the cantilevered portion 58. Accordingly, the height-adjustment assembly 74 allows for adjustment to compensate for these differences.

Referring to FIG. 3, the top portion 42 of the support structure 38 has an aperture 82 extending therethrough. The aperture 82 has internal threads 84. External threads 86 of the adjustment shaft 76 are in threaded engagement with the internal threads 84 for movement of the adjustment shaft 76 through the aperture 82 when the adjustment knob 78 is manually rotated.

Figure 6:
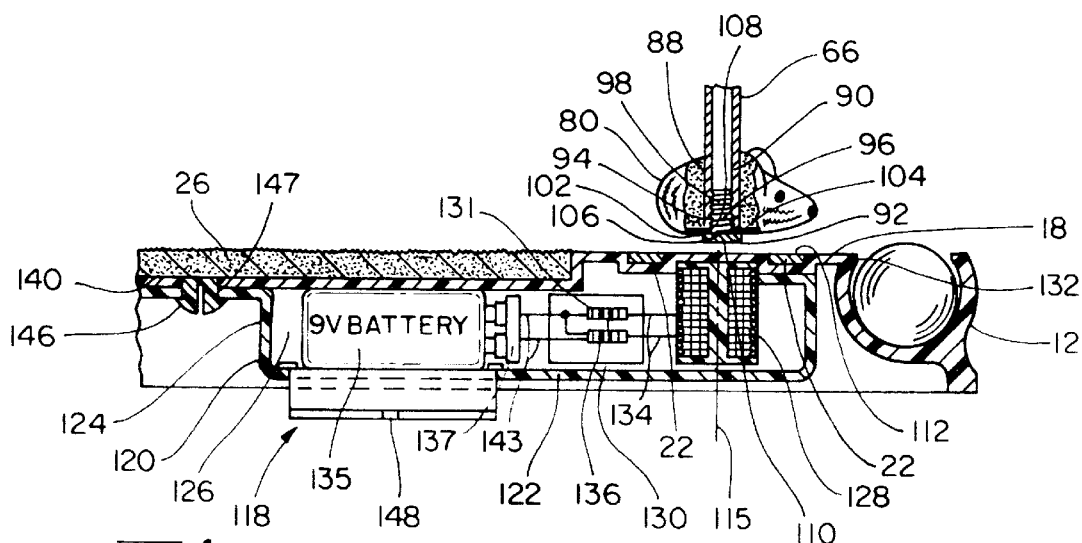
FIG. 6 is a sectional view of the embodiment shown in FIG. 1 and further including the electromagnetic assembly in connection therewith.

Referring to FIGS. 2 and 6, the cat toy member 80 is removably secured at the bottom portion 70 of the elongate vertical member 66. In a preferred embodiment, the cat toy member 80 has an open topped vertically oriented aperture 88 extending therethrough adapted for receiving a lower portion 90 of the elongate vertical member 66. A second magnet 92 is removably connected to the bottom end 94 of the elongate vertical member 66. The second magnet 92 has a threaded portion 96 threadingly engaging a hole 98 in the bottom end 94 for secured connection of the second magnet 92.

Referring to FIGS. 4a–4d, the device 10 is preferably provided with a cat toy member 80 and replacement cat toy members 100 having varied shapes and forms. The cat toy member 80 or replacement members 100 are easily installed on the device 10 by simply removing the second magnet 92 and inserting the lower portion 90 of the elongate vertical member 66 into the respective aperture 88 and replacing the second magnet 92 which has a diameter greater than the aperture 88.

Referring to FIG. 6, lower edges 102 of the bottom opening 104 of the aperture 88 for each cat toy member 80,100 is in pinching engagement between an upper surface 106 of the second magnet 92 and a lower edge 108 of the elongate vertical member 66, so that the cat toy member 80, 100 is secured with the member 66.

The first magnet or at least three permanent magnets 22 are secured to the base structure 12 on the magnet receiving platform 18 with upwardly facing surfaces 112 of the magnets 22 being generally flush with the upper surface 114 of the platform 18. A downwardly facing portion 110 of the cat toy or second magnet 92 has a magnetically repelling polarity to a polarity of the upwardly facing portion or surfaces 112 of the magnets 22.

Figure 7:
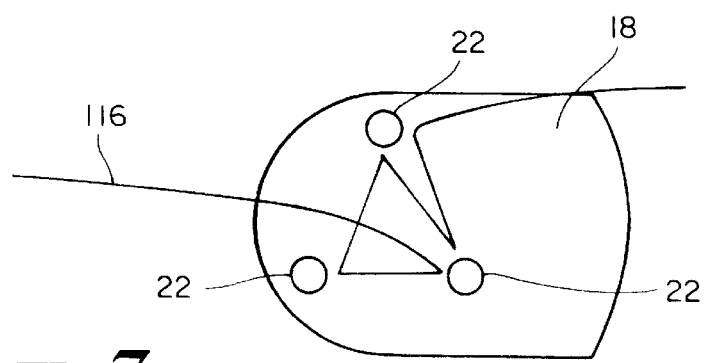
FIG. 7 is a diagrammatic plan view illustrating a representative path of travel of the cat toy member.

Referring to FIG. 7, the magnets 22 are arranged symmetrically with respect to a center 115 which in aligned with a vertical axis extending through the elongate vertical member 66 when at rest (FIG. 6). An example erratic path of travel 116 of the cat toy member 80 is illustrated. However, it should be understood that other numbers and arrangements of magnets 22 could be employed.

Figure 5:
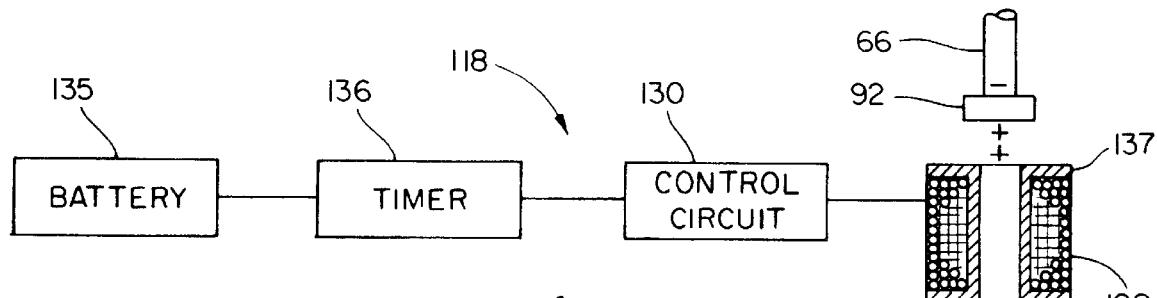
FIG. 5 is a diagrammatic view of an electromagnetic assembly for use with the present invention.
Figure 8:
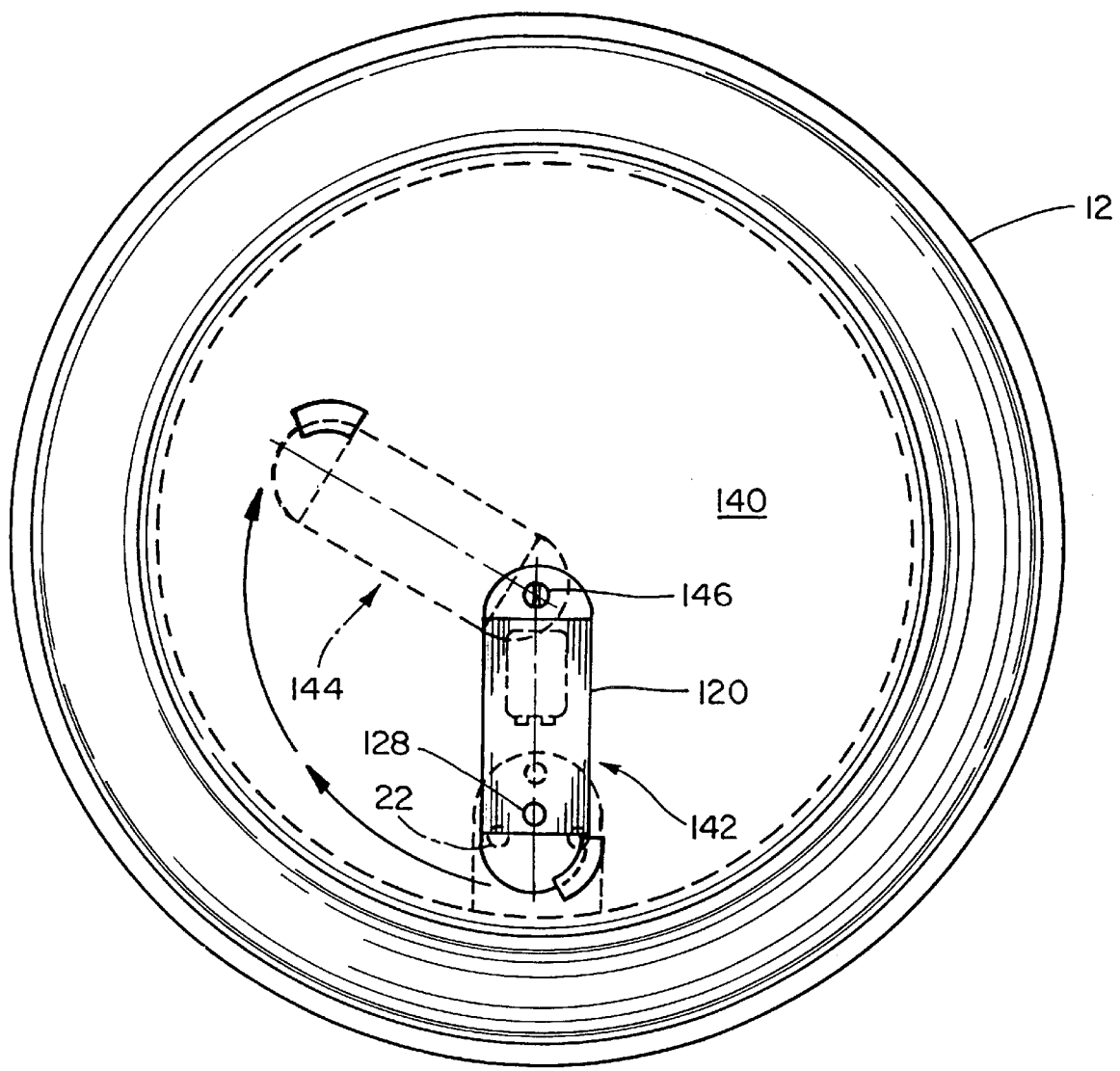
FIG. 8 is a bottom view of the embodiment shown in FIG. 6.

Referring to FIGS. 5, 6, and 8, an alternative embodiment is illustrated which includes the device 10 as previously discussed as well as the addition of an electromagnet assembly 118 secured therewith to enhance the movement of the cat toy member 80.

A housing 120 has a bottom 122 and sidewalls 124 which form an interior chamber 126 therewithin. An electromagnet 128 and circuitry 130 are secured with the housing 120 in the chamber 126. The housing 120 is separable from the base structure 12. When connected, the housing 120 is removably secured with the base structure 12 with the electromagnet 128 being positionable within the vertical axis extending through said pivot structure 72 and through the elongate vertical member 66 when at rest.

The electromagnet 128 is disposed below and adjacent to a top portion 132 of the base structure 12 which is under the magnet receiving platform 18. The circuitry 130 is electrically connected with the electromagnet 128 with wires 134 for actuating the electromagnet 128. The circuitry 130 includes sensing means for sensing a magnetic flux field generated by the second magnet 92 when the second magnet is moved across in close proximity to the electromagnet 92 to momentarily actuate the electromagnet 128 for brief period of time. The sensing of the circuitry 130 may be carried out by the use of a C 1815 GR551 transistor 131 which senses the change of voltage created through the coil 129 of the electromagnet 128 by the magnetic field passed across from the second magnet 92 and correspondingly closes the circuit to actuate the electromagnet 128. The electromagnet 128 then produces a magnetic field having a repelling polarity at an upper surface 137 compared with the polarity of the downwardly extending portion of the second magnet 92 so that the cat toy member 80 is quickly moved laterally away and where the magnets 22 are then also allowed to provide additional repelling motion to the second magnet 92.

A battery 135 is secured within the housing 120 with a battery connector 137 and wires 143 connecting the battery 135 with the circuitry 130. A battery compartment door 148 operatively connected with the housing 120 and provides access to the battery 135.

The circuitry 130 includes a timing circuit 136 for providing continued actuation of the electromagnet 128 responsive to the sensing means for a first predetermined period of time. The timing circuit has switching means for electrically discontinuing actuation of the electromagnet 128 for a second predetermined period of time following the first predetermined period. The timing circuit 136 is of the type generally known for use in other electronic applications and further description is not deemed necessary with the circuit 136 being implemented as above described.

For example, the cat toy member 80 is initially at rest (FIG. 6). A cat or kitten 138 will paw the cat toy member 80 causing movement thereof. The movement is sensed by the circuitry 130, as above described, to actuate the electromagnet 128 and start the first period of time, 90 seconds for example. Each time the second magnet 92 passes the electromagnet 128, the electromagnet 128 will be actuated during this first time period. After the first time period expires, the second period of time begins, 120 seconds for example. During this second time period, actuation of the electromagnet 128 will not occur. After this second time period, the cycle may be restarted upon sensing of movement from the second magnet 92.

Preferably, the housing 120 is movably secured to a bottom portion 140 of the base structure 12 from a first position 142 (FIG. 8) with the electromagnet 128 in close proximity to the magnetic field generated by the cat toy magnet 92 to a second position 144 with the electromagnet 128 in a spaced apart distance away from the magnetic field generated by the cat toy magnet 92. Hence, when placed in the second position 144, the electromagnet 128 will not be actuated. Further, it should be also noted that if the battery 135 of the assembly 118 was dead or use of the electromagnet 128 was not desired, the assembly 118 would be moved to the second position 144 so that the second magnet 92 would not be drawn to iron core of the electromagnet 128 causing the otherwise random and erratic motion of the cat toy member 80 to be diminished.

The housing 120 is swingable between the first and second positions 142,144 on a pivot 146 secured to the base structure 12. To allow the housing electromagnet assembly 118 to be an add-on feature, the housing 120 has an aperture 147 to receive the pivot 146, which may be a plastic split-head type pivot, in snap-fit engagement therewith.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. An exercise and amusement device for cats comprising:
   (a) a base structure;
   (b) a support structure extending upwardly from the base structure;
   (c) a pendulum assembly connected to the support structure, the pendulum assembly including an elongate vertical member having a top portion and a bottom portion, the pendulum assembly including a pivot structure secured to the top portion of the elongate vertical member, said pivot structure being a low-friction, close tolerance U-joint assembly allowing 360° pivoting movement;

(d) a cat toy member secured at the bottom portion of the elongate vertical member;

(e) a first magnet secured to the base structure; and (f) a second magnet disposed adjacent a bottom of the cat toy member, a downwardly facing portion of the second magnet having a magnetically repelling polarity to a polarity of an upwardly facing portion of the first magnet.

2. The device of claim 1, wherein the pendulum assembly includes height-adjustment means for manually adjusting the vertical spaced apart distance between the downwardly facing portion of the second magnet and the base structure.

3. The device of claim 2, wherein the support structure includes a top portion having an aperture extending therethrough, the aperture having internal threads, the height-adjustment means including an adjustment shaft having external threads in threaded engagement with the internal threads of said aperture.

4. The device of claim 1, wherein the cat toy member is removably secured at the bottom portion of the elongate vertical member.

5. The device of claim 4, wherein the cat toy member has a vertically oriented aperture adapted for receiving a lower portion of the elongate vertical member.

6. The device of claim 5, wherein the second magnet is removably connected to the bottom portion of the elongate vertical member.

7. The device of claim 1, wherein the second magnet includes means for threadingly engaging the bottom portion of the elongate vertical member for removable connection therewith.

8. The device of claim 1, wherein the support structure has a cantilevered portion disengagably connected with the support structure for disengagement of the cantilevered portion upon impact of a force thereupon.

9. The device of claim 1, wherein a portion of the base structure adjacent to the first magnet includes a durable covering secured thereto, the durable covering being penetrable by cat claws.

10. The device of claim 1, wherein the base structure includes arcuately shaped sidewalls defining a generally circular channel extending about a perimeter of the base structure, the circular channel being configured for receiving a ball in movable engagement within the channel.

11. The device of claim 1, further comprising an electromagnet disposed below and adjacent to a top portion of the base structure, and electronic means electrically connected with the electromagnet for actuating the electromagnet.

12. The device of claim 11, wherein the electronic means includes sensing means for sensing a magnetic flux field generated by the second magnet when the second magnet is moved in close proximity to the electromagnet to momentarily actuate the electromagnet.

13. The device of claim 12, wherein the electronic means includes timing means for providing continued actuation of the electromagnet responsive to the sensing means for a first predetermined period, the timing means having switching means for electrically discontinuing actuation of the electromagnet for a second predetermined period following said first predetermined period.

14. The device of claim 11, further comprising a housing having the electromagnet contained therein, the housing being movably secured to a bottom portion of the base structure from a first position with the electromagnet in close proximity to the magnetic field generated by the second magnet to a second position with the electromagnet in a spaced apart distance away from the magnetic field generated by the second magnet.

15. The device of claim 14, wherein the housing is swingable between the first and second position on a pivot secured to the base structure, the housing being removably separable from the base structure.

16. The device of claim 15, wherein the housing has means for receiving a battery and means for connecting the battery with the electronic means.

17. A magnetically actuated exercise and amusement device for cats comprising:

(a) a base structure;

(b) a support structure extending upwardly from the base structure;

(c) a pendulum assembly connected to the support structure, the pendulum assembly including: a rigid elongate vertical member having a top portion and a bottom portion, a pivot structure secured to the top portion of the elongate vertical member, said pivot structure being a low-friction, close tolerance U-joint assembly allowing 360° pivoting movement, and height-adjustment means for manually adjusting the vertical spaced apart distance between the bottom portion of the elongate vertical member and the base structure;

(d) a cat toy member secured at the bottom portion of the elongate vertical member;

(e) a first magnet secured to the base structure; and (f) a second magnet disposed adjacent with a bottom of the cat toy member, a downwardly facing portion of the second magnet having a magnetically repelling polarity to a polarity of an upwardly facing portion of the first magnet, a magnetic field strength between repelling first and second magnets being adjustable by a user with said height-adjustment means for varied cat toy member speed.

18. The device of claim 17, wherein the height-adjustment means includes a threaded adjustment shaft and a rotatable adjustment knob operatively connected with the adjustment shaft.

19. The device of claim 17, wherein the cat toy member is removably secured at the bottom portion of the elongate vertical member, and a replacement cat toy member is provided having varied shape from the cat toy member, the replacement cat toy member being removably securable to the bottom portion of the elongate vertical member in replacement of the cat toy member.

20. The device of claim 19, wherein a horizontal portion of the base structure adjacent to the first magnet includes a durable covering secured thereto, the durable covering being penetrable by cat claws, and the base structure includes arcuately shaped sidewalls defining a generally circular channel extending about a perimeter of the base structure, the circular channel being configured for receiving a ball in movable engagement within the channel.

21. The device of claim 17, wherein the cat toy member has a vertically oriented open-topped aperture adapted for receiving a lower portion of the elongate vertical member and the second magnet is removably connected to the bottom portion of the elongate vertical member in co-axial alignment therewith.

22. The device of claim 17, further comprising an electromagnet disposed below and adjacent to a top portion of the base structure, and electronic means electrically connected with the electromagnet for actuating the electromagnet, the electronic means including sensing means for sensing a magnetic flux field generated by the second magnet when the second magnet is moved in close proximity to the electromagnet to momentarily actuate the electromagnet.

23. The device of claim 22, wherein the electronic means includes timing means for providing continued actuation of the electromagnet responsive to the sensing means for a first predetermined period, the timing means having switching means for electrically discontinuing actuation of the electromagnet for a second predetermined period following said first predetermined period.

24. The device of claim 22, further comprising a housing having the electromagnet contained therein, the housing being movably secured to a bottom portion of the base structure from a first position with the electromagnet in close proximity to the magnetic field generated by the second magnet to a second position with the electromagnet in a spaced apart distance away from the magnetic field generated by the second magnet.

25. The device of claim 24, wherein the housing is swingable between the first and second position on a pivot secured to the base structure.

26. The device of claim 22, further comprising a housing having a bottom and sidewalls forming an interior chamber therewithin, the electromagnet and electronic means being secured with the housing, the housing being separable from the base structure, the housing being removably secured to the base structure with the electromagnet being positionable within a vertical axis extending through said pivot means.

27. A magnetically actuated exercise and amusement device for cats comprising:

(a) a base structure;

(b) a support structure extending upwardly from the base structure;

(c) a pendulum assembly connected to the support structure, the pendulum assembly including: a rigid elongate vertical member having a top portion and a bottom portion, pivot means secured to the top portion of the elongate vertical member for providing low-friction, close-tolerance 360° pivoting movement, and height-adjustment means for manually adjusting the vertical spaced apart distance between the bottom portion of the elongate vertical member and the base structure a distance of at least 0.25 inches, the height-adjustment means including a threaded adjustment shaft and a rotatable adjustment knob operatively connected with the adjustment shaft;

(d) a cat toy member removably secured at the bottom portion of the elongate vertical member;

(e) at least three magnets secured to the base structure; and (f) a cat toy magnet removably connected to the bottom portion of the elongate vertical member and adjacent with a bottom of the cat toy member, a downwardly facing portion of the cat toy magnet having a magnetically repelling polarity to a polarity of an upwardly facing portion of the at least three magnets, a magnetic field strength between the at least three magnets and the cat toy magnet being adjustable by a user with said height-adjustment means for varied cat toy member speed.

28. The device of claim 27, further comprising an electromagnet disposed below and adjacent to a top portion of the base structure, and electronic means electrically connected with the electromagnet for actuating the electromagnet, the electronic means including sensing means for sensing a magnetic flux field generated by the cat toy magnet when the cat toy magnet is moved in close proximity to the electromagnet to momentarily actuate the electromagnet.

29. The device of claim 28, wherein the electronic means includes timing means for providing continued actuation of the electromagnet responsive to the sensing means for a first predetermined period, the timing means having switching means for electrically discontinuing actuation of the electromagnet for a second predetermined period following said first predetermined period.

30. The device of claim 28, further comprising a housing having the electromagnet contained therein, the housing being movably secured to a bottom portion of the base structure from a first position with the electromagnet in close proximity to the magnetic field generated by the cat toy magnet to a second position with the electromagnet in a spaced apart distance away from the magnetic field generated by the cat toy magnet.

31. The device of claim 30, wherein the housing is swingable between the first and second positions on a pivot secured to the base structure.

* * * * *